United States Patent
Buyuktosunoglu et al.

(10) Patent No.: US 10,423,538 B2
(45) Date of Patent: Sep. 24, 2019

(54) BANDWIDTH EFFICIENT TECHNIQUES FOR ENABLING TAGGED MEMORIES

(71) Applicant: International Business Machines Corporation, Armonk, NY (US)

(72) Inventors: Alper Buyuktosunoglu, White Plains, NY (US); Seokin Hong, Eastchester, NY (US); Prashant Jayaprakash Nair, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/825,411

(22) Filed: Nov. 29, 2017

(65) Prior Publication Data
US 2019/0163640 A1    May 30, 2019

(51) Int. Cl.
*G06F 12/1018*    (2016.01)
*G06F 16/13*    (2019.01)

(52) U.S. Cl.
CPC ........ *G06F 12/1018* (2013.01); *G06F 16/134* (2019.01); *G06F 16/137* (2019.01)

(58) Field of Classification Search
CPC ........... G06F 12/1018; G06F 17/30094; G06F 17/30097
See application file for complete search history.

(56) References Cited

U.S. PATENT DOCUMENTS

| 6,101,614 A | 8/2000 | Gonzales et al. |
|---|---|---|
| 6,192,451 B1 | 2/2001 | Arimilli et al. |
| 8,997,103 B2 | 3/2015 | Gadre et al. |
| 2013/0311722 A1* | 11/2013 | Arelakis ............ H03M 7/40 711/122 |

OTHER PUBLICATIONS

Flajolet et al "Birthday paradox" (Elsevier Science Publishers, 1992) [online] [retrieved on Dec. 4, 2018]. Retrieved from the Internet <http://algo.inria.fr/flajolet/Publications/FlGaTh92.pdf> (Year: 1992).*

(Continued)

*Primary Examiner* — David Yi
*Assistant Examiner* — Dustin B. Fulford
(74) *Attorney, Agent, or Firm* — Cantor Colburn LLP; Samuel Waldbaum

(57) ABSTRACT

Embodiments include techniques for receiving a cacheline of data, hashing the cacheline into a plurality of chunks, wherein each chunk includes a pattern of bits, storing the plurality of chunks in a pattern table, wherein the plurality of chunks are indexed in the pattern table based on the pattern of bits of each chunk, and identifying a repeated pattern of bits of the plurality of chunks and selecting the repeated pattern of bits as candidate pattern. Techniques include comparing a threshold number of bits of the candidate pattern to the pattern of bits of the plurality of chunks in the pattern table; based on the comparison, inserting valid bits and a tag into the pattern table for the candidate pattern by replacing bits in the candidate pattern, and writing the candidate pattern, including the valid bits and the tag, into a location of the memory corresponding to the candidate pattern.

18 Claims, 7 Drawing Sheets

(56) References Cited

OTHER PUBLICATIONS

Handy, Jim "The Cache Memory Book" (Academic Press, 1993) pp. 60, 89, 249, 259 (Year: 1993).*

Alameldeen et al "Frequent Pattern Compression" [online] Published in Technical Report 1500, Computer Sciences Dept., UW-Madison, Apr. 2004 [retrieved on Dec. 3, 2018]. Retrieved from the internet <URL: https://pdfs.semanticscholar.org/e7c6/f67a70b5cf0842a7a2fc497131a79b6ee2c5.pdf> (Year: 2004).*

Raghavendra et al "PBC: Prefetched Blocks Compaction" [online] Published Oct. 26, 2015 [retrieved on Dec. 10, 2018]. Retrieved from the Internet <URL: https://ieeexplore.ieee.org/document/7303910> (Year: 2015).*

Gao et al "Zero-Chunk: An Efficient Cache Algorithm to Accelerate the I/O Processing of Data Deduplication" [online] Published to IEEE Xplore Jan. 19, 2017, Date of Conference Dec. 13-16, 2016 [retrieved on Nov. 8, 2018]. Retrieved from the Internet <URL:https://ieeexplore.ieee.org/document/7823804> (Year: 2016).*

Anonymously; "Method for Using a Cache to Improve Link Bandwidth"; http://ip.com/IPCOM/000244098D; IP.com No. IPCOM000244098D, Nov. 9, 2015, 3 pages.

Goosens, S. et al.; "Reconfigurable Real-Time Memory Controller Architecture"; Memory Controllers for Mixed-Time-Criticality Systems; 2016, 41 Pages.

\* cited by examiner

BANDWIDTH EFFICIENT TECHNIQUES FOR ENABLING TAGGED MEMORIES

BACKGROUND

The present invention generally relates to data access and storage, and more specifically, to bandwidth efficient techniques for enabling tagged memories.

In today's environment, general computer systems store data in memory such as random access memory (RAM), and data can also be stored in storage such as hard disk drives and other devices. The memory is used to store instructions and programs that are executed in the computer systems. RAM is a type of memory device that is used most frequently as main memory in computer systems which is able to store large amounts of data in a small area. Cache is used to store information that is frequently accessed and/or most recently accessed to improve processing efficiency and reduce access latency from the central processing unit (CPU) and the secondary storage. The secondary storage devices can be used to store files and data that are infrequently used. The latency between the CPU retrieving data from the secondary storage devices is longer than that of the cache. The RAM, cache, and secondary storage devices makeup the memory system and are configured in a hierarchy to balance the performance, speed, and overhead when accessing data in the different memory locations of the system.

SUMMARY

Embodiments of the present invention are directed to a computer-implemented method for bandwidth efficient techniques for enabling tagged memories. A non-limiting example of the computer-implemented method includes receiving a cacheline of data, hashing the cacheline into a plurality of chunks, wherein each chunk includes a pattern of bits, and storing the plurality of chunks in a pattern table, wherein the plurality of chunks are indexed in the pattern table based on the pattern of bits of each chunk. The computer-implemented method also includes identifying a repeated pattern of bits of the plurality of chunks and selecting the repeated pattern of bits as candidate pattern, and comparing a threshold number of bits of the candidate pattern to the pattern of bits of the plurality of chunks in the pattern table. The computer-implemented method includes based on the comparison, inserting valid bits and a tag into the pattern table for the candidate pattern by replacing bits in the candidate pattern, and writing the candidate pattern, including the valid bits and the tag, into a location of memory corresponding to the candidate pattern.

Embodiments of the present invention are directed to a system for bandwidth efficient techniques for enabling tagged memories. A non-limiting example of the system includes a memory controller including hashing logic module, counter, and a pattern table; and a storage medium, the storage medium being coupled to a processor, wherein the storage medium includes a data region and a tag region, the processor is configured to receive a cacheline of data, hash the cacheline into a plurality of chunks, wherein each chunk includes a pattern of bits, and store the plurality of chunks in a pattern table, wherein the plurality of chunks are indexed in the pattern table based on the pattern of bits of each chunk. The processor is also configured to identify a repeated pattern of bits of the plurality of chunks and selecting the repeated pattern of bits as candidate pattern, and compare a threshold number of bits of the candidate pattern to the pattern of bits of the plurality of chunks in the pattern table. The processor is configured to based on the comparison, insert valid bits and a tag into the pattern table for the candidate pattern by replacing bits in the candidate pattern, and write the candidate pattern, including the valid bits and the tag, into a location of the memory corresponding to the candidate pattern.

Embodiments of the invention are directed to a computer program product for bandwidth efficient techniques for enabling tagged memories, the computer program product comprising a computer readable storage medium having program instructions embodied therewith. The program instructions are executable by a processor to cause the processor to perform a method. A non-limiting example of the method includes receiving a cacheline of data, hashing the cacheline into a plurality of chunks, wherein each chunk includes a pattern of bits, and storing the plurality of chunks in a pattern table, wherein the plurality of chunks are indexed in the pattern table based on the pattern of bits of each chunk. The method also includes identifying a repeated pattern of bits of the plurality of chunks and selecting the repeated pattern of bits as candidate pattern, and comparing a threshold number of bits of the candidate pattern to the pattern of bits of the plurality of chunks in the pattern table. The method includes based on the comparison, inserting valid bits and a tag into the pattern table for the candidate pattern by replacing bits in the candidate pattern, and writing the candidate pattern, including the valid bits and the tag, into a location of memory corresponding to the candidate pattern.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
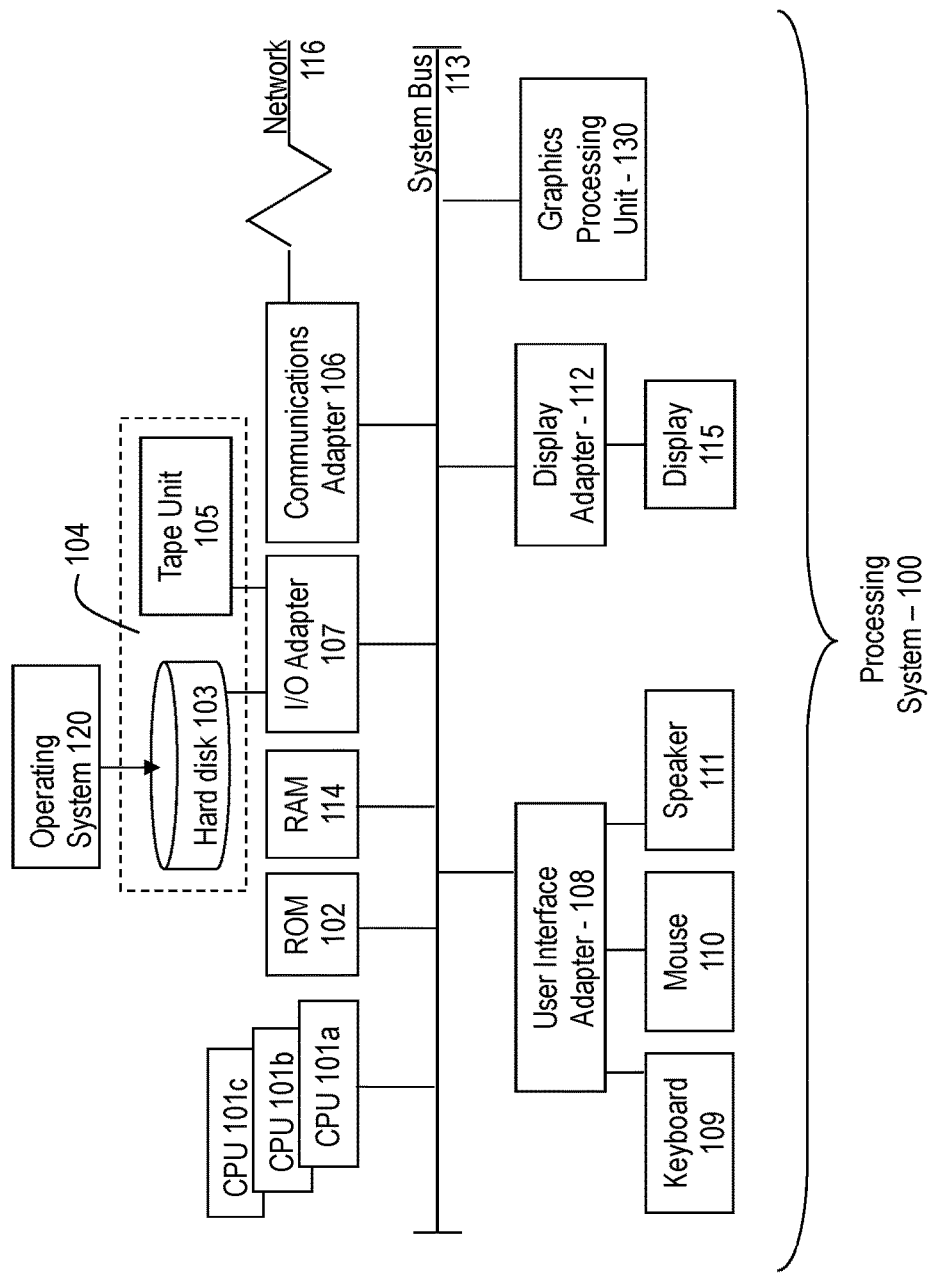
FIG. 1 depicts a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, tags are traditionally stored in a separate region of memory from the cacheline of data, where the tags store least recently used (LRU)/least frequently used (LFU) information, paging policy, caching policy, error correction code (ECC), etc. In particular, the tag information is not stored in the same data line in main memory in conventional configurations. Because the tags are stored in a separate region of the main memory, a subsequent access to the memory is required to retrieve the tag information associated with a cacheline being processed.

One configuration of the system memory includes 8 chips and cumulatively each of the chips store 64 bytes of data. The memory controller is configured to fetch and write data to/from the memory in 64 byte blocks.

In current memory systems, there is no space for storing tags (metadata) within the chips storing the 64 byte cacheline of data. Specifically, there is no space for storing tags for page policy or cache policy within the same cacheline of memory, and therefore, the page policy, cache policy, tags, etc. must be stored in other locations requiring multiple accesses to obtain the data and respective tag. No space is available in the main memory to store this tag information.

Because of this configuration, a first access has to locate the specific data and then perform a second access to a different region of the memory that stores the associated tag. For example, the data can be stored in the main memory of a computer system and tags associated with the data are stored in one or more cache memories or separate regions of the memory.

In addition, the data stored in the main memory is random and cannot be readily compressed to provide more memory space to store additional information in the memory. The techniques described herein divide the cacheline into a plurality of chunks to identify the repeating patterns of bits of the chunks and manipulates the bits in one of the repeated patterns to store additional information.

The patterns of bits of each chunk are identified by hashing the cacheline into a pattern table including a plurality of bins and counting the repeated chunks. The number of bins (chunks) can be selected based on the size of the cacheline. The locations in memory corresponding to at least one of the repeating patterns of bits of a cacheline can be modified to store tag data.

Turning now to an overview of the aspects of the invention, one or more embodiments of the invention address the above-described shortcomings of the prior art by providing a technique to store the data and the associated tag (metadata) all in the same cacheline or block of main memory.

The above-described aspects of the invention address the shortcomings of the prior art by leveraging repeated patterns of cachelines and replacing bits memory locations corresponding to the repeated patterns to store tag information. In one or more embodiments, the birthday paradox, a theory in probability, is used to efficiently determine repeating patterns of bits in a cacheline either from memory or to be written to memory.

The birthday paradox is used to determine the number of people in a set of randomly selected people that share a birthday. There is a 100% probability of identifying a pair of individuals sharing a birthday if the set includes 367 people, since there are only 366 possible days if February 29 is included. However, the birthday paradox provides that a very high probability (99.9%) is reached with only 70 people in the set. This theory is based on the assumption that each day of the year is equally probable for a birthday to occur (except February 29). In one or more aspects, the system is configured using the birthday paradox to efficiently manage the storage of data where the details will be described below.

In a non-limiting example, a main memory storing data in 64 byte cachelines is used to illustrate one or more embodiments. In this example, when a 64 byte cacheline of data is received, it is hashed into 12 bit chunks and stored in a pattern table having 215 entries. The pattern table is larger enough to discover any repeating 12-bit data chunks of the 64 byte line in accordance with the byte line. According to the birthday paradox 99% probability=$3.303*sqrt(2^b)$, where b=bits_per_bin.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

One or more techniques described herein including receiving a 64 byte (512-bit) cacheline and dividing it into a number of chunks based on the birthday paradox. According to the birthday paradox 193 bins are needed to divide the 64 byte cacheline into a number of chunks to determine a repeated pattern of 12-bit chunks. The particular pattern may not be known but there is a 99% probability that a pattern will be repeated using 193 bins.

To accommodate the 193 bins, 5 hash engines are used, in this example, to select bits of the cacheline to load into the pattern table. The 5 hash engines are coupled to a counter used to hash the cacheline. In an embodiment, the counter counts up to 43 where the counter is used by the hash functions to select 12 bits from the cacheline per count value. In some embodiments, the counter is configured to count to 43, where 43×5 hashes provides 215 bins in the pattern table for a 64 byte cacheline. This provides 215 bins in the pattern table which is greater than 193 needed to achieve 99% probability of identifying a repeated pattern based on the birthday paradox. It is also to be understood that different configurations of cacheline size, hash engines, pattern table entries and bin size can be used.

Figure 2:
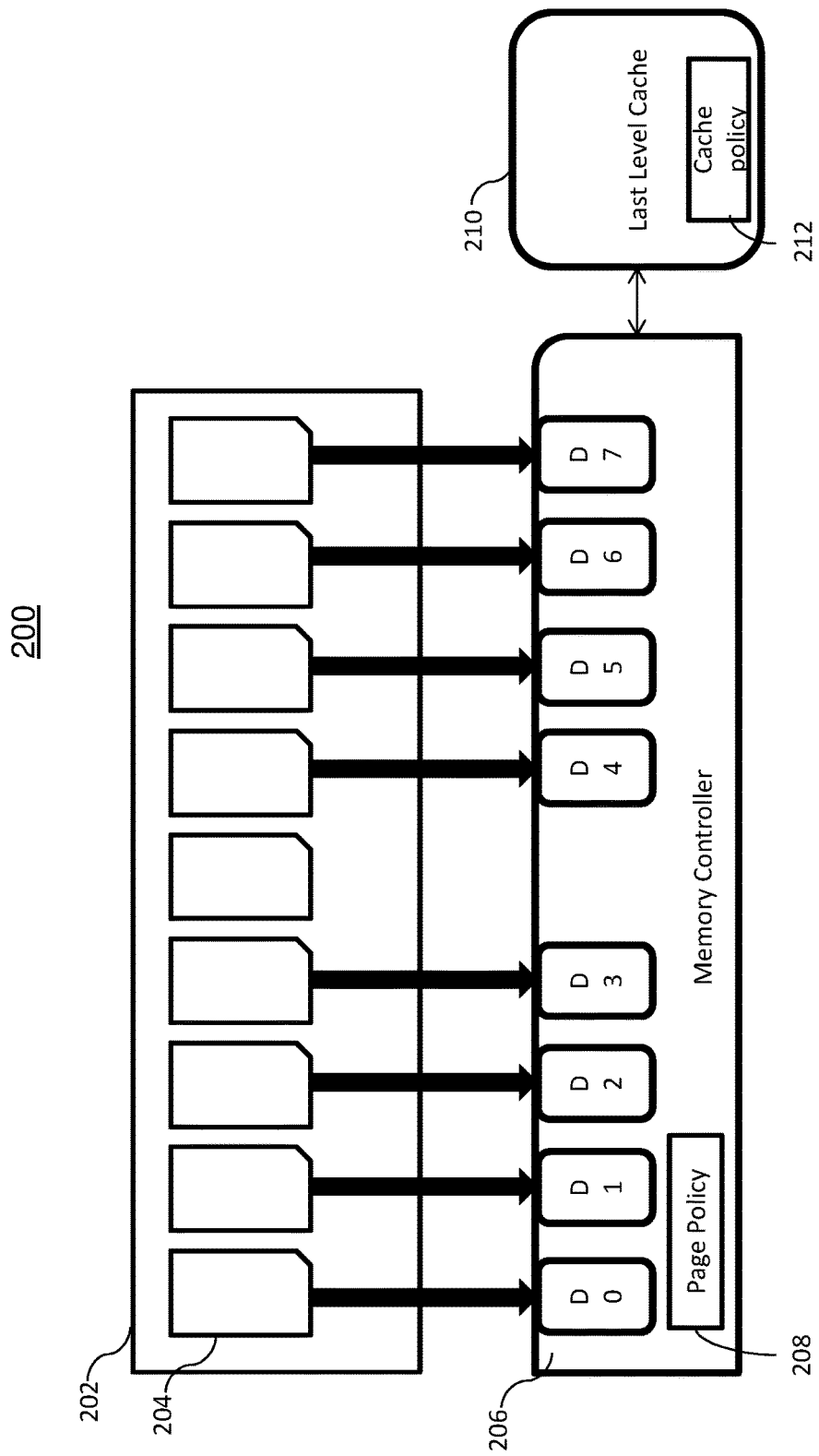
FIG. 2 depicts a memory system in accordance with one or more embodiments.

Referring now to FIG. 2, a system 200 is shown. The system includes an integrated circuit 202 having a plurality of chips 204. The chips 204 are configured to store data and are configured to transfer data in a cacheline. In a non-limiting example, the main memory systems can store data in 64 byte cacheline-size chunks. It is to be understood that different chunk sizes can be used. The system 200 includes a memory controller 206. In some embodiments, the memory controller 206 can include page policy 208 that is implemented in managing the storage and transfer of data.

The memory controller 206 as shown is coupled to the cache 210. In some embodiments, the cache 210 is configured to store rules such as a cache policy 212 used for storing data.

Figure 3:
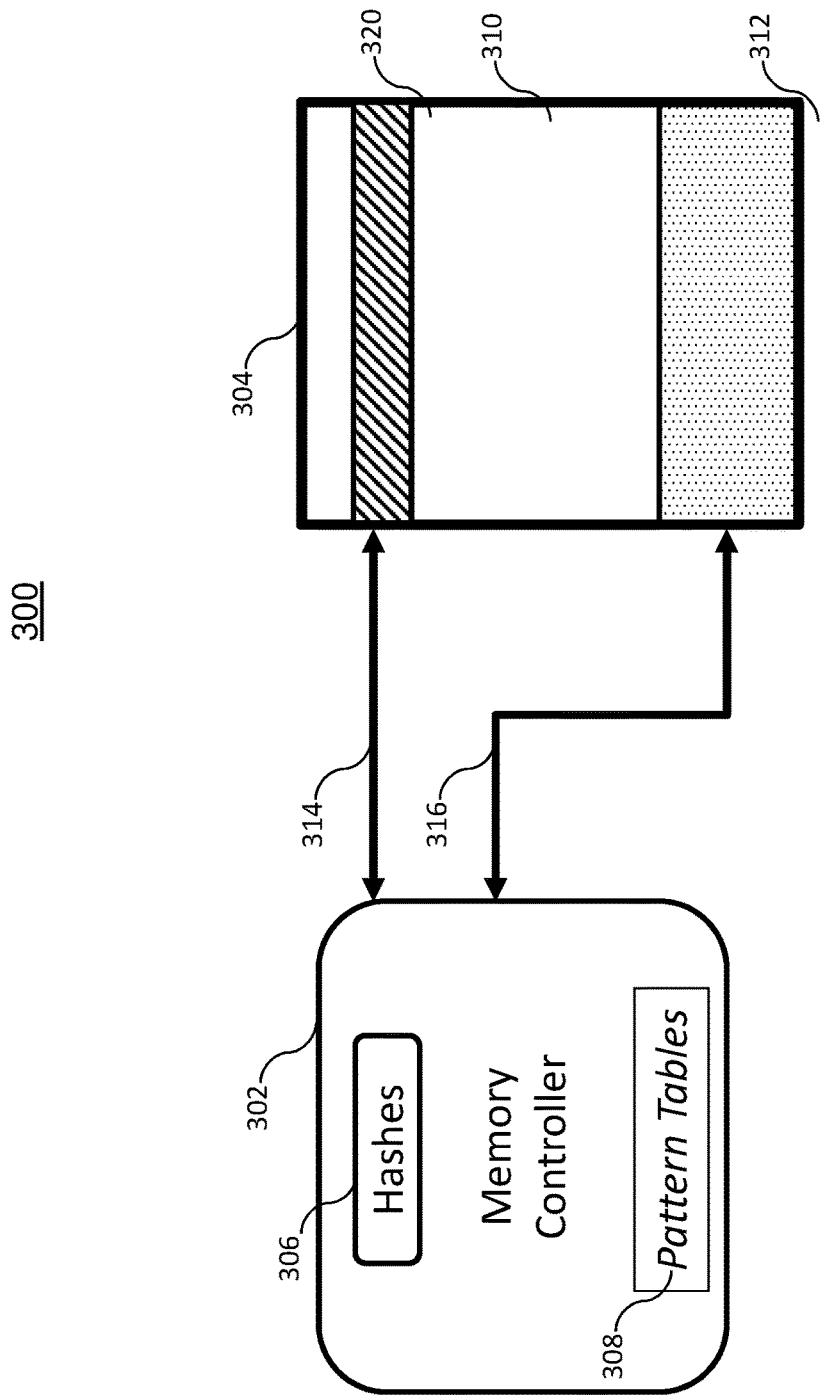
FIG. 3 depicts a memory system in accordance with one or more embodiments.

Now referring to FIG. 3, a system 300 implementing one or more embodiments is shown. As shown in the system 300, a memory controller 302 is coupled to a memory system 304. The memory controller 302 is configured with one or more hash engines 306 and pattern tables 308. The hash engines 306 are used to select set of bits (chunks) from a cacheline to store in the pattern tables 308. The memory system 304 can include the main memory 202 as shown in FIG. 2 and other storage, caches, etc. The main memory system 304 is configured with a data region 310 and a tag region 312 represented by the shaded region. The striped region 320 represents a cacheline being accessed.

Traditionally, the memory controller 302 accesses the data region 310 of the main memory system 304 and subsequently accesses the tag region 312 to fulfill a data request. As shown in FIG. 3, the connection 314 illustrates a first access to the data region 310 and the connection 314 illustrates an access to the tag region 312. By implementing the techniques described below, the subsequent access 316 to the backup area for tag storage in the tag region 312 is reduced because tag information can now be stored in the cacheline in the data region 320. Therefore, the tag region 312 is only accessed when the tag information is not present in the received cacheline.

Figure 4:
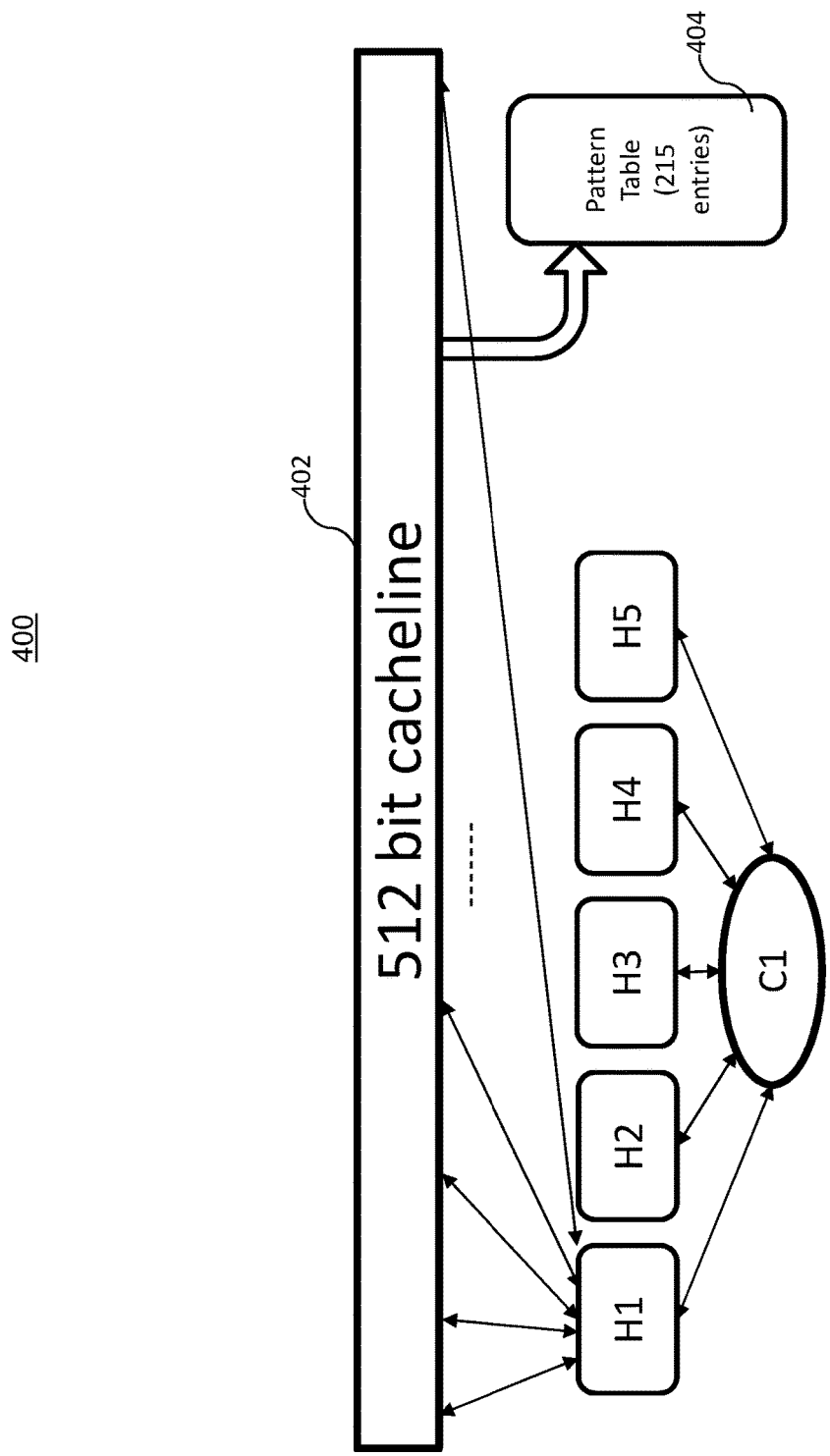
FIG. 4 depicts a hash engine in accordance with one or more embodiments.

Referring now to FIG. 4, hash engines 400 for hashing a cacheline in accordance with one or more embodiments is shown. A cacheline 402 is chunked into a set of bits by hash engines H1, H2, H3, H4, and H5 into a pattern table 404. It is to be understood that different cacheline sizes and a different number of hash engines can be used in different embodiments. In one or more embodiments, the hash engines H1-H5 are coupled to a counter C1 to select different sets of bits from the cacheline 402. In the scenario where a 512 bit cacheline is being hashed, 5 hash engines are used to divide the cacheline into 12-bit chunks. Each hash engine (H1-H5) is configured to hash the cacheline into 43 bins of the pattern table using counter C1. Because each hash engine H1-H5 selects 12 bits per count value of the counter C1, 215 bins will result in the pattern table 404 if the counter C1 is configured to count to 43. In the 512 bit cacheline example, 215 bins exceed the 193 bins needed to discover a repeated pattern to a 99% probability in accordance with the birthday paradox. It is to be understood that different configurations can be used.

Figure 5:
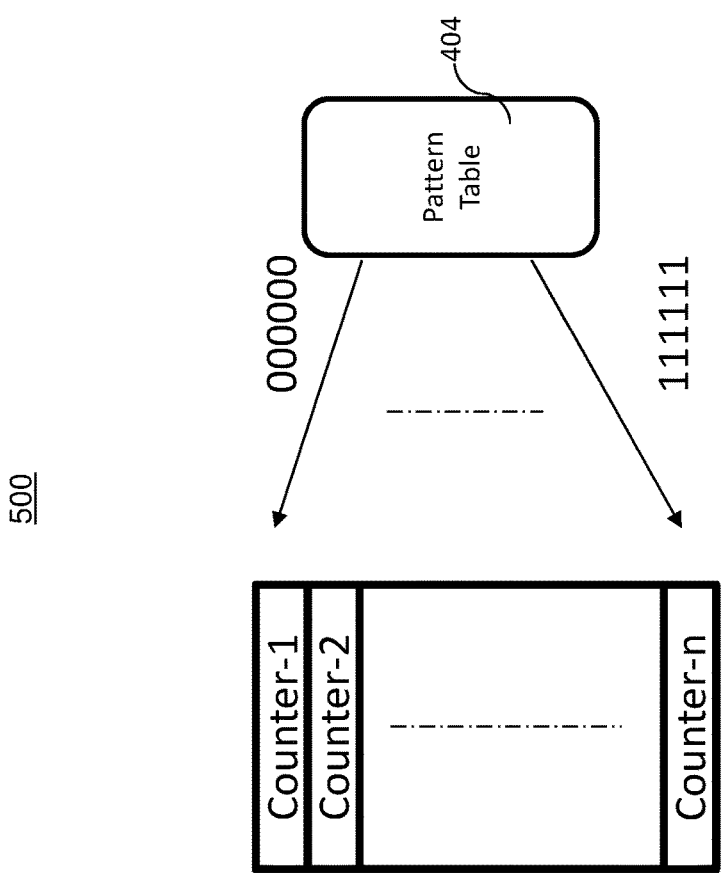
FIG. 5 depicts a pattern table in accordance with one or more embodiments.

Now referring to FIG. 5, a pattern table 500 in accordance with one or more embodiments is shown. The pattern table 500 is configured with a plurality of entries. Each entry in the pattern table is associated with an index, where the index represents a pattern. For example, the first index is "000000" and represents a pattern of bits in a hashed data chunk "000000." As the cacheline is hashed into different sets of bits a count value is stored in each corresponding entry in the pattern table 404 representing the occurrence of the sets of bits appearing in the hashed cacheline.

After the pattern table 404 is populated, a look-up is performed using a candidate pattern to determine whether a portion of pattern of bits matches another pattern stored in the pattern table. For example, a 12-bit pattern having the pattern "100100100100" that is repeated in a received cacheline where another pattern stored in the pattern table 404 includes the bits "100100100111." In this example, the first 12-bit pattern is selected as the candidate pattern because the pattern is repeated in the cacheline and the count value is set to at least 2.

In one or more embodiments, a threshold number of bits of the candidate pattern is used in a look-up process to determine whether other patterns stored in the pattern table match the candidate pattern. In one embodiment, the threshold number of bits is configured to 8-bits. In this example, the look-up is performed using the candidate pattern 10010010XXXX, where "X" is a don't care bit. The candidate pattern and the second pattern "100100100111" indicates that the two patterns share the first 10 bits. In this scenario, valid/invalid bits will be set in one of the locations of the repeated pattern for "100100100100" because more than two patterns match the first 8 bits. If the other 12-bit pattern is "100100111111" and no other patterns of bits matched the first 8 bits of the candidate pattern, then a valid bit will be set in a location in memory associated with one of the repeated patterns.

In one or more embodiments, the valid/invalid bits are 3-bits. A valid indicator can be "000" while an invalid indicator can be "111." In one example, the 3-bit valid indicator can be inserted after the first 8 bits of the candidate pattern. In the current example, the candidate pattern and valid bits result in "10010010'000'X." The remaining "X-bit" can be used to store the tag data associated with the hashed cacheline. The 8-bits of the candidate pattern, valid bits, and tag can be stored one of the memory locations corresponding to the repeated pattern.

In the event where an additional pattern in the pattern table matches the top 8 bits, the invalid bits are inserted and the tag is retrieved from the backup area for storing tags. In this example, "10010010'111'X" can be stored in a memory location of one of the repeated patterns in main memory.

In the scenario when a cacheline is received from the main memory, the cacheline is hashed in a similar manner as described above. After the patterns are entered in the pattern table, the repeating patterns are determined. For example, if the cacheline is hashed and includes the repeated pattern "100100100001." This pattern is selected as the candidate pattern where the top 8 bits will be compared to the other patterns in the pattern table.

If the top 8-bits are matched in the comparison, the next three valid/invalid bits are checked. For example, if the pattern is "10010010'000'1," the following 3-bits are checked. If the 3-bits indicate "000" the data is valid and the following tag bit is used. If the following 3-bits are "111" the tag will be retrieved from the backup area for tag storage. In the event that there are no repeating patterns (candidate patterns) in the cacheline, the appropriate tag will be retrieved from the backup area for tag storage.

Figure 6:
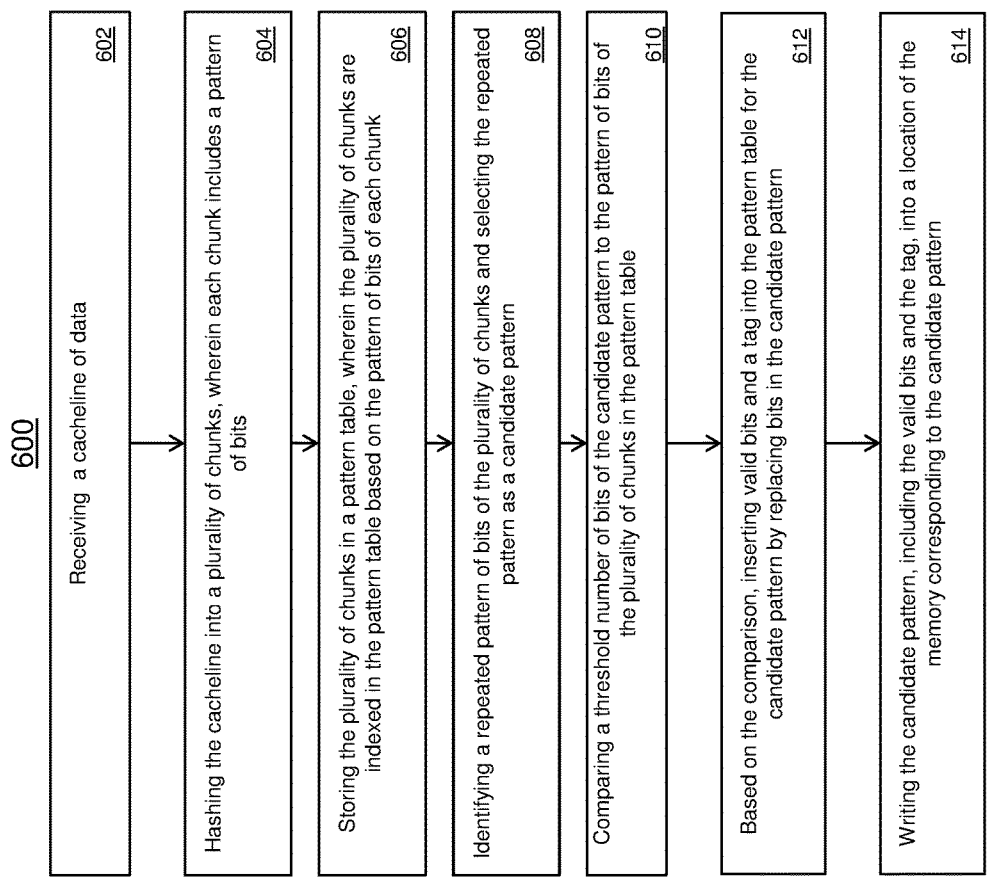
FIG. 6 depicts a flow chart for a writing operation in accordance with one or more embodiments.

Referring now to FIG. 6 a method 600 for using bandwidth efficient techniques for enabling tagged memories is shown.

Block 602 provides receiving a cacheline of data. In one or more embodiments, the cacheline of data is received responsive to a read request or write request. In some embodiments, the cacheline is received by a memory controller that is coupled to a CPU and a main memory. It is to be understood that the memory controller can include other components or be coupled to other devices.

Block 604 provides hashing the cacheline into a plurality of chunks, wherein each chunk includes a pattern of bits. In one or more embodiments, one or more hash engines are configured to select bits of a cacheline in order to divide the cacheline into a number of chunks to determine the whether a repeating pattern exists in the cacheline. In a non-limiting example, each hash engine selects 12 bits of the cacheline to store in an entry of the pattern table.

Block 606 provides storing the plurality of chunks in a pattern table, wherein the plurality of chunks are indexed in the pattern table based on the pattern of bits of each chunk. In one or more embodiments, the pattern table is configured with a plurality of entries. The number of entries can be based on the size of the cacheline being hashed and the size of the bins of each entry in the pattern table. In this example, 2^12 entries are used in the hash table because the bin size is 12 bits, where each entry added to the pattern table is based on the pattern of bits of the respective chunks.

Block 608 provides identifying a repeated pattern of bits of the plurality of chunks and selecting the repeated pattern as a candidate pattern. In some embodiments, the pattern table increments a count value for each occurrence of a pattern of bits in the pattern table. If the count value stored with an entry is greater than 1, the particular pattern is a repeated pattern and is selected as a candidate pattern. The candidate pattern is used to perform a look-up operation in the pattern table. In one or more embodiments, a counter can be used to track the repeated patterns.

Block 610 provides comparing a threshold number of bits of the candidate pattern to the pattern of bits of the plurality of chunks in the pattern table. In one or more embodiments, the threshold number of bits is based on the size of the candidate pattern. In the example, referenced above the candidate pattern is 12 bits. The threshold number of bits in this example is the top 8 bits. These top 8 bits of the candidate pattern are compared to the top 8 bits of the other entries in the pattern table to determine if there is a match.

Block 612 provides based on the comparison, inserting valid bits and a tag into the pattern table for the candidate pattern by replacing bits in the candidate pattern. If the comparison reveals a match, valid bits are placed after the top 8 bits of the candidate pattern in the pattern table. In one or more embodiments, the valid bits are 3 bits in length and indicates that a repeated pattern is found. A 1-bit tag is placed after the valid bits. In one or more embodiments, the tag indicates one of a metadata, reusability of cacheline, hot or cold pages, open-page, or close page policy and is not associated with a cache tag.

In the event, the comparison does not result in a match, invalid bits are inserted in the candidate pattern and a backup area for tag storage is searched for the corresponding tag.

Block 614 provides writing the candidate pattern, including the valid bits and the tag, into a location of memory corresponding to the candidate pattern. In one or more embodiments, a location of memory including corresponding to one of the repeated patterns is written or overwritten with the threshold portion of the candidate pattern, the valid bits, and the tag while the other repeated pattern remains unmodified in memory.

Figure 7:
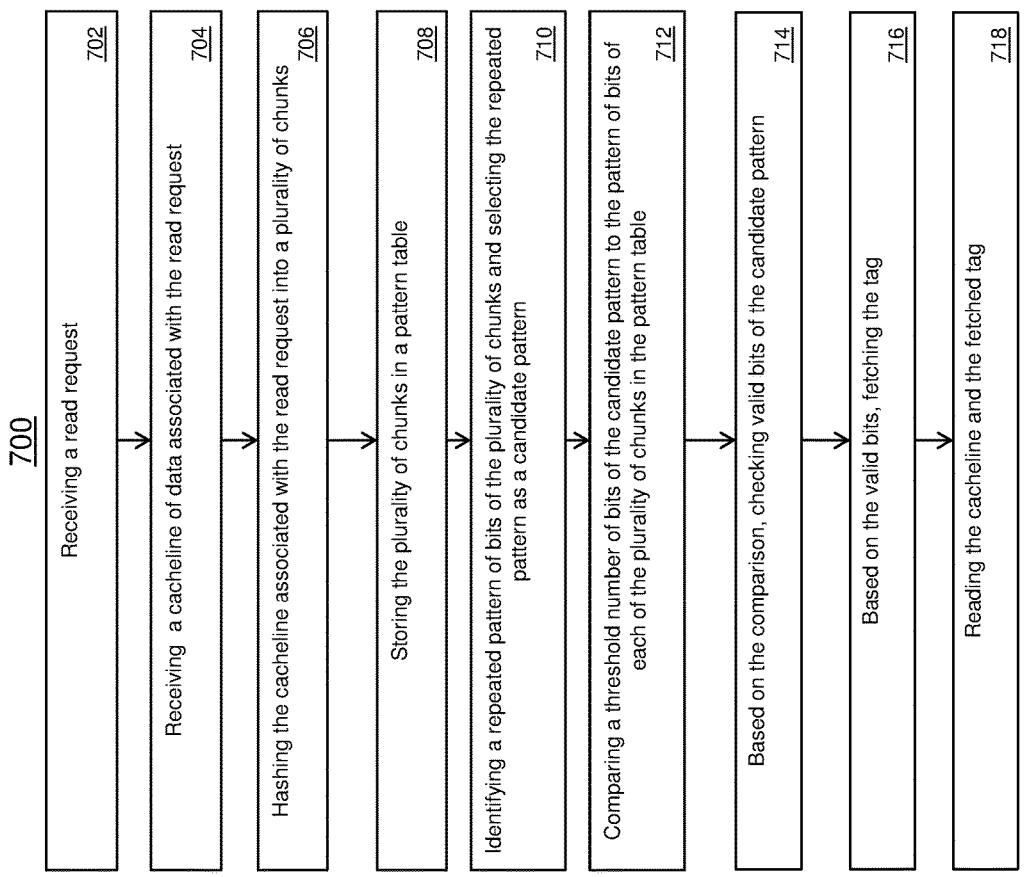
FIG. 7 depicts a flow chart for a reading operation in accordance with one or more embodiments.

Referring now to FIG. 7 a method 700 for using bandwidth efficient techniques for enabling tagged memories is shown.

Block 702 provides receiving a read request. Block 704 provides receiving a cacheline associated with the read request. In one or more embodiments, the cacheline is read from the main memory. In a non-limiting example, the cacheline is a 64 byte cacheline size.

Block 706 provides hashing the cacheline associated with the read request into a plurality of chunks. Some embodiments the hashing is performed in a similar manner as provided in FIG. 6. For example, for a 64 byte cacheline, 5 hash engines are used to select a set of bits of the cacheline to divide the 64 byte cacheline into 12-bit chunks.

Block 708 provides storing the plurality of chunks in the pattern table. In one or more embodiments, the hashed chunks are stored in an entry in the pattern table having an index corresponding to the pattern of bits of the chunk. In an example, the pattern table includes an available entry for each of the possible pattern of bits and is configured to with bins for storing a count value associated with the occurrence of each pattern.

Block 710 provides identifying a repeated pattern of bits of the plurality of chunks and selecting the repeated pattern as a candidate pattern. In one or more embodiments, a count value is stored in the pattern table corresponding to the number of times a pattern of bits is repeated. The candidate pattern is a pattern of bits of the chunk that is repeated in the cacheline. In one or more embodiments, the candidate pattern is 12-bits long.

Block 712 provides comparing a threshold number of bits of the candidate pattern to the pattern of bits of each of the plurality of chunks in the pattern table. In one or more embodiments, the threshold number of bits is 8-bits in length when the candidate pattern is 12-bits in length. The top 8 bits of the candidate pattern are compared to each of the entries in the pattern table.

Block 714 provides based on the comparison, checking valid bits of the candidate pattern. In one or more embodiments, if the comparison provides a match, the valid bits of the candidate pattern are checked. In some embodiments, the valid/invalid bits are located after the top 8 bits of the candidate pattern. The valid bits are the 3 bits following the top 8 bits of the candidate pattern. If the valid bits match, then a 1-bit tag is inserted following the valid bits. In the event, the valid bits do not match the backup area for tag storage is accessed for processing.

Block 716 provides based on the valid bits, fetching the tag. Block 718 provides reading the cacheline and the fetched tag. In one or more embodiments, the 8 bits of the candidate pattern can be expanded with the known repeated pattern and processed by the CPU.

One or more techniques described herein provide an improvement over the prior art by allowing the storage of a tag (metadata, not a cache tag) in the same cacheline as the data in the main memory. For example, in the conventional systems storing tags in separate regions, 100% of the time after accessing the cacheline of data a subsequent access to the tag storage area will be performed. The effective bandwidth of this procedure is 0.5×.

The techniques implemented herein provide for the tags to be retrieved from main memory in the same cacheline including the data without having multiple accesses to the memory, such as an access to the data and a subsequent access to the backup tag storage area. Because the data of the cacheline is scrambled or random, the cacheline is divided into chunks to determine if patterns in the random data exist. There is a chance where some of the chunks repeat and the space corresponding to one of the repeated patterns in the main memory can be leveraged to store tag data. The one or more of the bits corresponding to at least one of the repeated patterns can be modified to store metadata associated with the cacheline in the memory.

Now a subsequent access to the tag information in a separate area of memory is not needed. Therefore, bandwidth efficiency is improved now that the tag region of the memory is not accessed as frequently. By using the birthday paradox to configure the system, 99% of the time the tags can be retrieved from the cacheline of data and 1% of the time the tags will not be in the cacheline of data and will be retrieved from the tag storage area. Therefore, the effective bandwidth of this technique is 0.995×.

The techniques described herein improve the operation of the computer itself by increasing the performance in processing data by the CPU. In addition, the efficiency of the data being processed and transmitted in the network is increased because the latency associated with processing the data is reduced.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for bandwidth efficient techniques for enabling tagged memories comprising:
   receiving a cacheline of data;
   hashing the cacheline into a plurality of chunks, wherein each chunk includes a pattern of bits;
   storing the plurality of chunks in a pattern table, wherein the plurality of chunks are indexed in the pattern table based on the pattern of bits of each chunk;
   identifying a repeated pattern of bits of the plurality of chunks and selecting the repeated pattern of bits as candidate pattern, wherein the candidate pattern includes non-zero patterns;
   comparing a threshold number of bits of the candidate pattern to the pattern of bits of the plurality of chunks in the pattern table;

based on the comparison, inserting valid bits and a tag into the pattern table for the candidate pattern by replacing bits in the candidate pattern; and writing the candidate pattern, including the valid bits and the tag, into a location of memory corresponding to the candidate pattern;

wherein comparing the threshold number of bits include matching first 8 bits of the candidate pattern to first 8 bits of entries in the pattern table; and responsive to the matching, replacing 3 bits after the first 8 bits of the candidate pattern in the pattern table with a valid indicator, and 1 bit after the valid indicator with a 1-bit tag.

2. The computer-implemented method of claim 1, wherein based on the comparison, inserting invalid bits indicating no candidate patterns are eligible for storing data in the memory and subsequently searching a tag region of memory.

3. The computer-implemented method of claim 1, wherein the threshold number of bits is less than a size of the candidate pattern.

4. The computer-implemented method of claim 1, further comprising receiving a read request;

receiving a cacheline associated with the read request;

hashing the cacheline associated with the read request into a plurality of chunks;

storing the plurality of chunks in the pattern table;

identifying a repeated pattern of bits of the plurality of chunks and selecting the repeated pattern as a candidate pattern;

comparing a threshold number of bits of the candidate pattern to the pattern of bits of each of the plurality of chunks in the pattern table;

based on the comparison, checking valid bits of the candidate pattern;

based on the valid bits, fetching the tag; and reading the cacheline and the fetched tag.

5. The computer-implemented method of claim 4, further comprising responsive to the valid bits, subsequently searching a tag region of memory for a tag associated with the read request, wherein the tag region is separate from a data region of the memory.

6. The computer-implemented method of claim 1, wherein the hashing includes 5 hash function using 43 bins per hash function and wherein the pattern table is configured with 215 entries to store hashed chunks of the cacheline.

7. The computer-implemented method of claim 1, wherein bins of the pattern table are 12 bits.

8. The computer-implemented method of claim 1, wherein the tag indicates one of a metadata, reusability of cacheline, hot or cold pages, open-page, or close page policy.

9. The computer-implemented method of claim 1, wherein counting uses a counter to update counter values associated with each index of the pattern table, wherein each index represents a pattern, wherein updating counter values is based at least in part on repeating a pattern associated with the index of the pattern table.

10. A computer program product for bandwidth efficient techniques for enabling tagged memories, the computer program product comprising:

a computer readable storage medium having stored thereon program instructions executable by a processor to cause the processor to:

receive a cacheline of data;

hash the cacheline into a plurality of chunks, wherein each chunk includes a pattern of bits;

store the plurality of chunks in a pattern table, wherein the plurality of chunks are indexed in the pattern table based on the pattern of bits of each chunk;

identify a repeated pattern of bits of the plurality of chunks and selecting the repeated pattern of bits as candidate pattern, wherein the candidate pattern includes non-zero patterns;

compare a threshold number of bits of the candidate pattern to the pattern of bits of the plurality of chunks in the pattern table;

based on the comparison, insert valid bits and a tag into the pattern table for the candidate pattern by replacing bits in the candidate pattern; and write the candidate pattern, including the valid bits and the tag, into a location of memory corresponding to the candidate pattern;

wherein comparing the threshold number of bits include matching first 8 bits of the candidate pattern to first 8 bits of entries in the pattern table; and responsive to the matching, replacing 3 bits after the first 8 bits of the candidate pattern in the pattern table with a valid indicator, and 1 bit after the valid indicator with a 1-bit tag.

11. The computer program product of claim 10, wherein based on the comparison, inserting invalid bits indicating no candidate patterns are eligible for storing data in the memory and subsequently searching a tag region of memory.

12. The computer program product of claim 10, wherein the threshold number of bits is less than a size of the candidate pattern.

13. The computer program product of claim 10, wherein the instructions are further executable by the processor to cause the processor to receive a read request;

receive a cacheline associated with the read request;

hash the cacheline associated with the read request into a plurality of chunks;

store the plurality of chunks in the pattern table;

identify a repeated pattern of bits of the plurality of chunks and selecting the repeated pattern as a candidate pattern;

compare a threshold number of bits of the candidate pattern to the pattern of bits of each of the plurality of chunks in the pattern table;

based on the comparison, check valid bits of the candidate pattern;

based on the valid bits, fetch the tag; and read the cacheline and the fetched tag.

14. The computer program product of claim 13, wherein the instructions are further executable by the processor to cause the processor to responsive to the valid bits, subsequently search a tag region of memory for a tag associated with the read request, wherein the tag region is separate from a data region of the memory.

15. The computer program product of claim 10, wherein the hashing includes 5 hash functions using 43 bins per hash function and wherein the pattern table is configured with 215 entries to store hashed chunks of the cacheline, wherein each bin the pattern table is 12 bits.

16. The computer program product of claim 10, wherein counting uses a counter to update counter values associated with each index of the pattern table, wherein each index represents a pattern of bits, wherein updating counter values is based at least in part on repeating a pattern associated with the index of the pattern table.

17. A system for bandwidth efficient techniques for enabling tagged memories, the system comprising:

a memory controller including hashing logic module, counter, and a pattern table;
a storage medium, the storage medium being coupled to a processor, wherein the storage medium includes a data region and a tag region;
the processor configured to:
    receive a cacheline of data;
    hash the cacheline into a plurality of chunks, wherein each chunk includes a pattern of bits;
    store the plurality of chunks in a pattern table, wherein the plurality of chunks are indexed in the pattern table based on the pattern of bits of each chunk;
    identify a repeated pattern of bits of the plurality of chunks and selecting the repeated pattern of bits as candidate pattern, wherein the candidate pattern includes non-zero patterns;
    compare a threshold number of bits of the candidate pattern to the pattern of bits of the plurality of chunks in the pattern table;
    based on the comparison, insert valid bits and a tag into the pattern table for the candidate pattern by replacing bits in the candidate pattern;
    write the candidate pattern, including the valid bits and the tag, into a location of the memory corresponding to the candidate pattern;
        wherein comparing the threshold number of bits include matching first 8 bits of the candidate pattern to first 8 bits of entries in the pattern table; and
        responsive to the matching, replacing 3 bits after the first 8 bits of the candidate pattern in the pattern table with a valid indicator, and 1 bit after the valid indicator with a 1-bit tag.

18. The system of claim 17, wherein the processor is further configured to receive a read request;
    receive a cacheline associated with the read request;
    hash the cacheline associated with the read request into a plurality of chunks;
    store the plurality of chunks in the pattern table;
    identify a repeated pattern of bits of the plurality of chunks and selecting the repeated pattern as a candidate pattern;
    compare a threshold number of bits of the candidate pattern to the pattern of bits of each of the plurality of chunks in the pattern table;
    based on the comparison, check valid bits of the candidate pattern;
    based on the valid bits, fetch the tag; and
    read the cacheline and the fetched tag.

* * * * *